(12) United States Patent
Chen

(10) Patent No.: US 6,817,680 B2
(45) Date of Patent: *Nov. 16, 2004

(54) BICYCLE WHEEL RIM WITH A REINFORCED BASE WALL

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/331,585

(22) Filed: Dec. 30, 2002

(65) Prior Publication Data

US 2003/0173823 A1 Sep. 18, 2003

(30) Foreign Application Priority Data

Mar. 15, 2002 (TW) ........................ 91203167 U

(51) Int. Cl.[7] ................ B60B 21/00; B60B 25/00; B60B 1/02
(52) U.S. Cl. .................. 301/95.104; 301/95.101; 301/58
(58) Field of Search .............. 301/55, 58, 95.101, 301/95.104, 95.105, 95.106, 95.107, 95.108; 29/894.33, 894.35

(56) References Cited

U.S. PATENT DOCUMENTS

| | | | | |
|---|---|---|---|---|
| 339,422 | A | * | 4/1886 | Hudson ............. 301/95.104 |
| 365,091 | A | * | 6/1887 | Owen .................... 301/58 |
| 2,937,905 | A | * | 5/1960 | Altenburger .............. 301/58 |
| 3,784,260 | A | * | 1/1974 | Araya .............. 301/95.105 |
| 4,319,785 | A | * | 3/1982 | Sato et al. ........ 301/95.104 |
| 6,257,677 | B1 | | 7/2001 | Chen .................... 301/95 |
| 6,402,255 | B1 | | 6/2002 | Chen ............... 301/95.101 |

* cited by examiner

Primary Examiner—Russell D. Stormer
Assistant Examiner—Jason R. Bellinger
(74) Attorney, Agent, or Firm—Trop, Pruner & Hu, P.C.

(57) ABSTRACT

A bicycle wheel rim has spaced-apart annular tire retaining walls, and a reinforced base wall interconnecting the tire retaining walls. The base wall includes left and right corner parts, and an intermediate part extending between the corner parts. The intermediate part has a vaulted portion, which is vaulted radially, and is formed with spoke mounting holes, which are distributed between the vaulted portion and the corner parts.

11 Claims, 7 Drawing Sheets

US 6,817,680 B2

BICYCLE WHEEL RIM WITH A REINFORCED BASE WALL

CROSS-REFERENCE TO RELATED APPLICATION

This application claims priority of Taiwanese Application No. 091203167, filed on Mar. 15, 2002.

BACKGROUND OF THE INVENTION

1. Field of the Invention

The present invention relates to a bicycle wheel rim, more particularly to a bicycle wheel rim with a reinforced base wall.

2. Description of the Related Art

Referring to FIGS. 1 and 2, a conventional bicycle wheel rim 1 is shown to include annular left and right tire retaining walls 11 and an annular spoke mounting wall 12 interconnecting radial inner edges of the tire retaining walls 11. The spoke mounting wall 12 is formed with a plurality of spoke fastening holes 121 that are arranged generally along a central portion of the spoke mounting wall 12 for mounting spoke fasteners 102 thereon. A plurality of spokes 101 are fastened to the spoke fasteners 102 for mounting the bicycle wheel rim 1 on two opposite ends of a hub (not shown). The aforementioned conventional bicycle wheel rim 1, however, suffers from the following drawback: Since the spoke fastening holes 121 are arranged along the central portion of the spoke mounting wall 12, the central portion of the spoke mounting wall 12 is susceptible to deformation due to the tension forces applied by the spokes 101 when the bicycle wheel rim 1 is in use.

To reinforce the strength of the bicycle wheel rim, it has been proposed in the art to provide a bicycle wheel rim 2 with a two-layer base wall unit which includes an annular spoke mounting wall 22 extending between the tire retaining walls 21, and an annular bridging wall 23 disposed around the spoke mounting wall 22 and bridging the tire retaining walls 21, as shown in FIG. 3. The base wall unit further includes a pair of inclined reinforcing walls 24 extending between the bridging wall 23 and the spoke mounting wall 22. To permit the installation of spoke fasteners 203, the bridging wall 23 must be formed with a plurality of through holes 231 aligned respectively with spoke fastening holes 221 in the spoke mounting wall 22 to permit passage of the spoke fasteners 203 therethrough. The through holes 231 and the spoke fastening holes 221 are typically formed by punching. However, since the through holes 231 and the spoke fastening holes 221 differ in size, formation of the through holes 231 and the spoke fastening holes 221 thus involves a complicated punching process. Moreover, chips of the metal of the wheel rim 2 removed during the punching process could be received within the cavity 223 that is confined by the spoke mounting wall 22, the bridging wall 23, and the reinforcing walls 24, and are difficult to be discharged therefrom.

SUMMARY OF THE INVENTION

Therefore, the main object of the present invention is to provide a bicycle wheel rim that has a reinforced base wall and that permits formation of spoke fastening holes in the base wall through a simple punching process.

According to a first aspect of the present invention, a bicycle wheel rim includes an annular rim body with a central axis. The rim body includes annular left and right tire retaining walls which are spaced-apart from each other, and an annular connecting wall. Each of the tire retaining walls has a radial inner edge proximate to the central axis of the rim body. The base wall interconnects the radial inner edges of the left and right tire retaining walls, and cooperates with the tire retaining walls to confine a tire retaining space thereamong. The base wall includes left and right corner parts disposed adjacent and connected to the left and right tire retaining walls, respectively, and an intermediate part extending between the corner parts. The intermediate part has a vaulted portion, which is vaulted in a radial inward direction with respect to the central axis. The intermediate part is formed with a first set of spoke mounting holes which are distributed along the base wall between the vaulted portion and the left corner part, and a second set of spoke mounting holes which are distributed along the base wall between the vaulted portion and the right corner part.

According to a second aspect of the present invention, a bicycle wheel rim includes an annular rim body with a central axis. The rim body includes annular left and right tire retaining walls which are spaced-apart from each other, and an annular base wall. Each of the tire retaining walls has a radial inner edge proximate to the central axis of the rim body. The base wall interconnects the radial inner edges of the tire retaining walls, and cooperates with the tire retaining walls to confine a tire retaining space thereamong. The base wall includes left and right corner parts disposed adjacent and connected to the left and right tire retaining walls, respectively, and an intermediate part extending between the corner parts. The intermediate part has a vaulted portion which is vaulted in a radial outward direction with respect to the central axis, a left wall section extending between the vaulted portion and the left corner part and formed with a first set of spoke mounting holes, and a right wall section extending between the vaulted portion and the right corner part and formed with a second set of spoke mounting holes. Each of the left and right wall sections has a first terminating edge connected to the respective one of the left and right corner parts, and a second terminating edge opposite to the first terminating edge and connected to the vaulted portion. The intermediate part of the base wall further includes a bridging wall, which extends between the second terminating edges of the left and right wall sections. The bridging wall is flush with the left and right wall sections.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
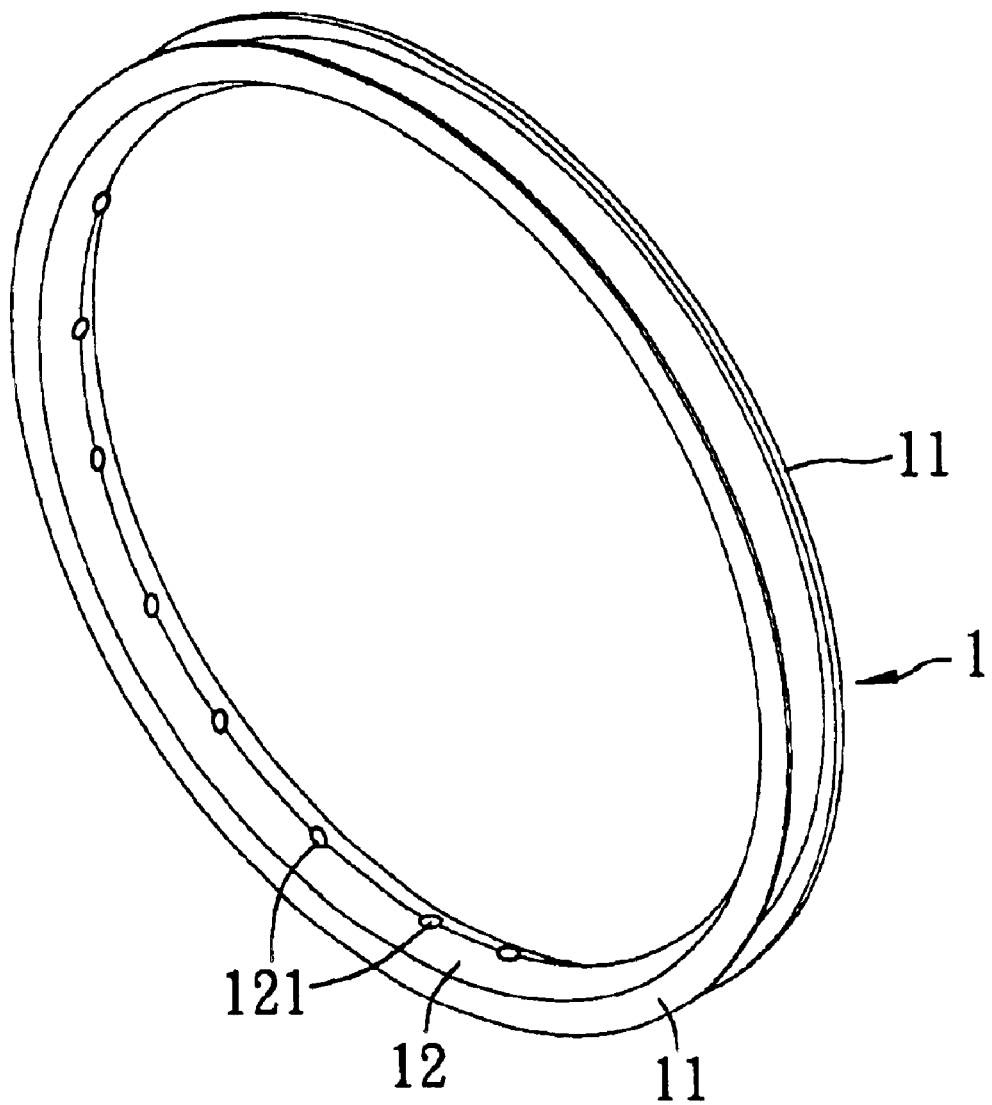
FIG. 1 is a perspective view of a first conventional bicycle wheel rim.
Figure 2:
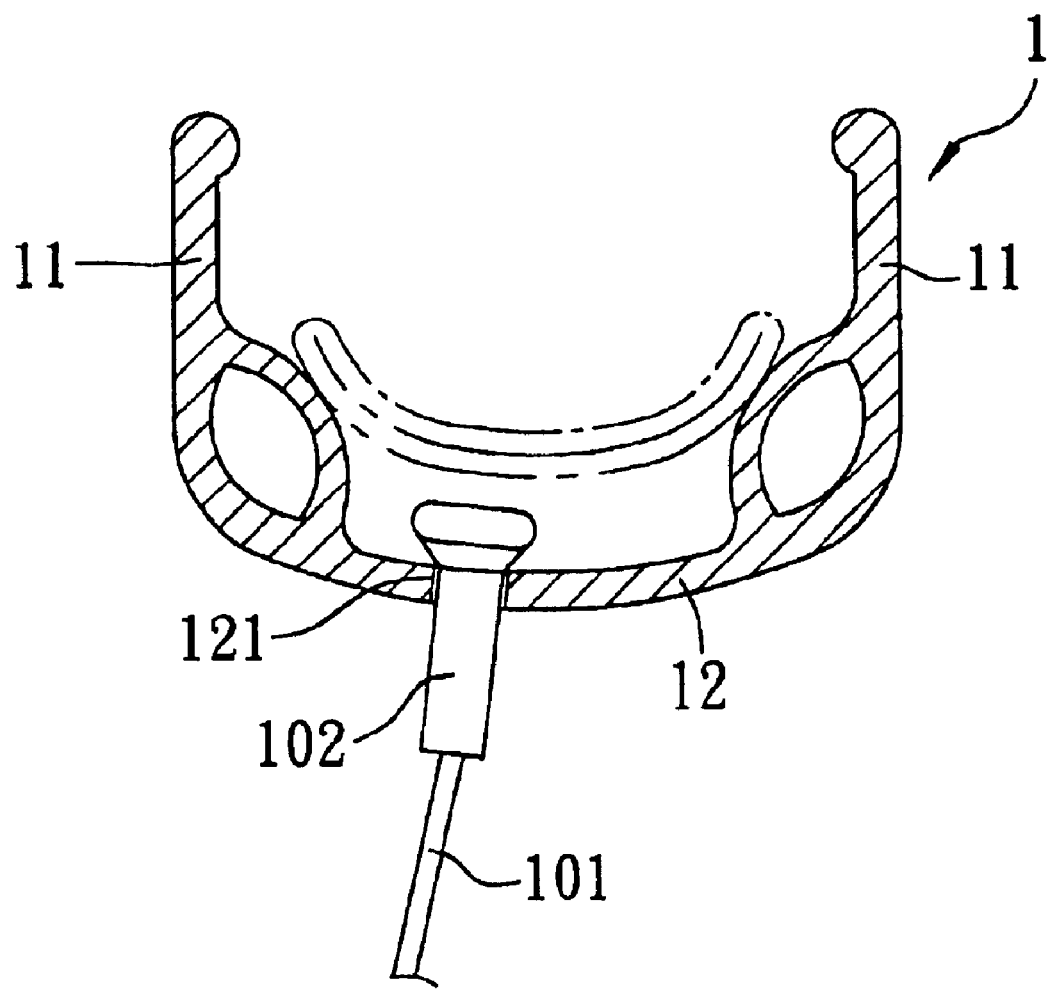
FIG. 2 is a fragmentary sectional view of the conventional bicycle wheel rim of FIG. 1, where the wheel rim is shown to have a spoke mounted thereon.
Figure 3:
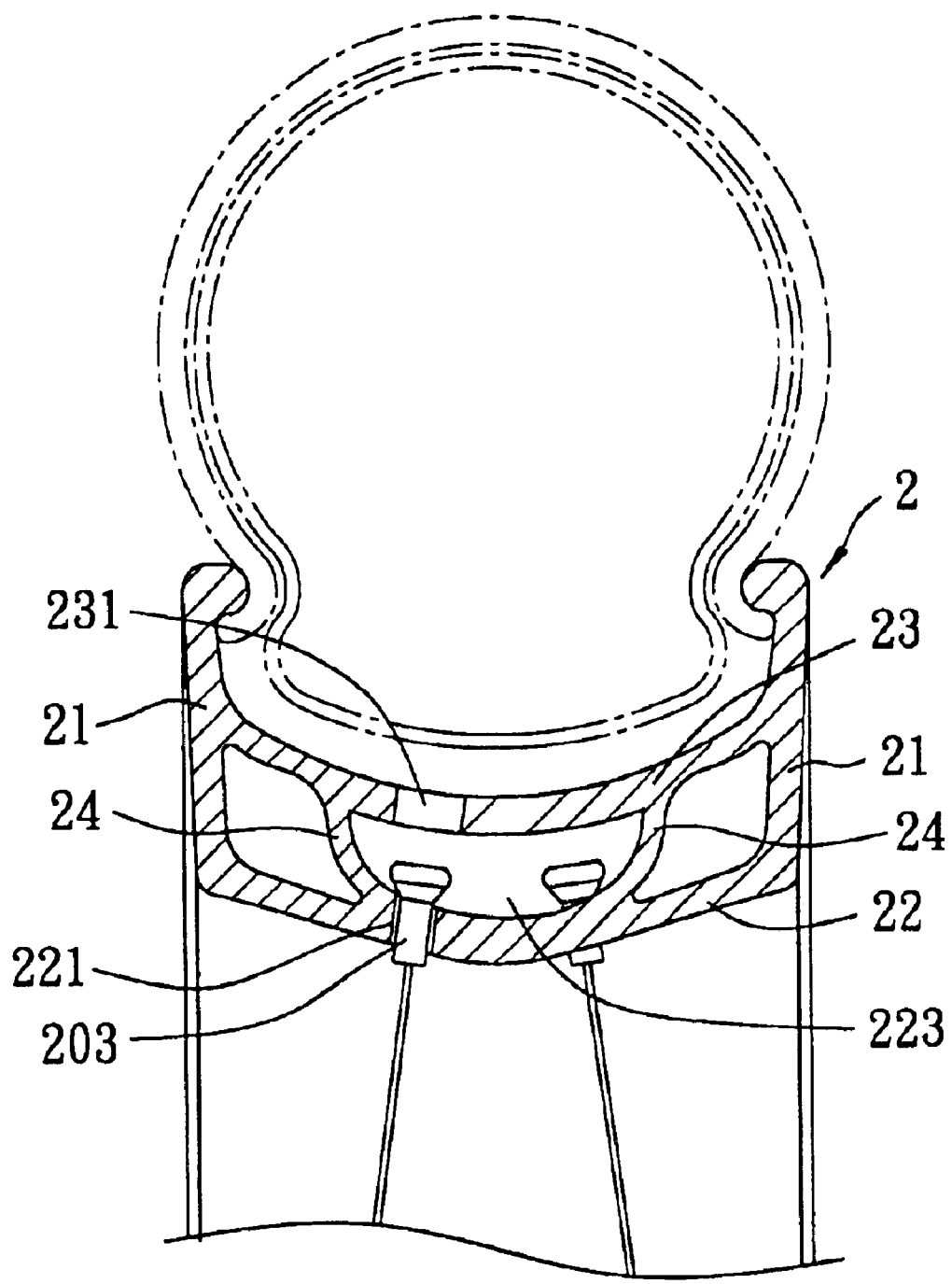
FIG. 3 is a fragmentary sectional view of a second conventional bicycle wheel rim.

Before the present invention is described in greater detail, it should be noted that like elements are denoted by the same reference numerals throughout the disclosure.

Figure 4:
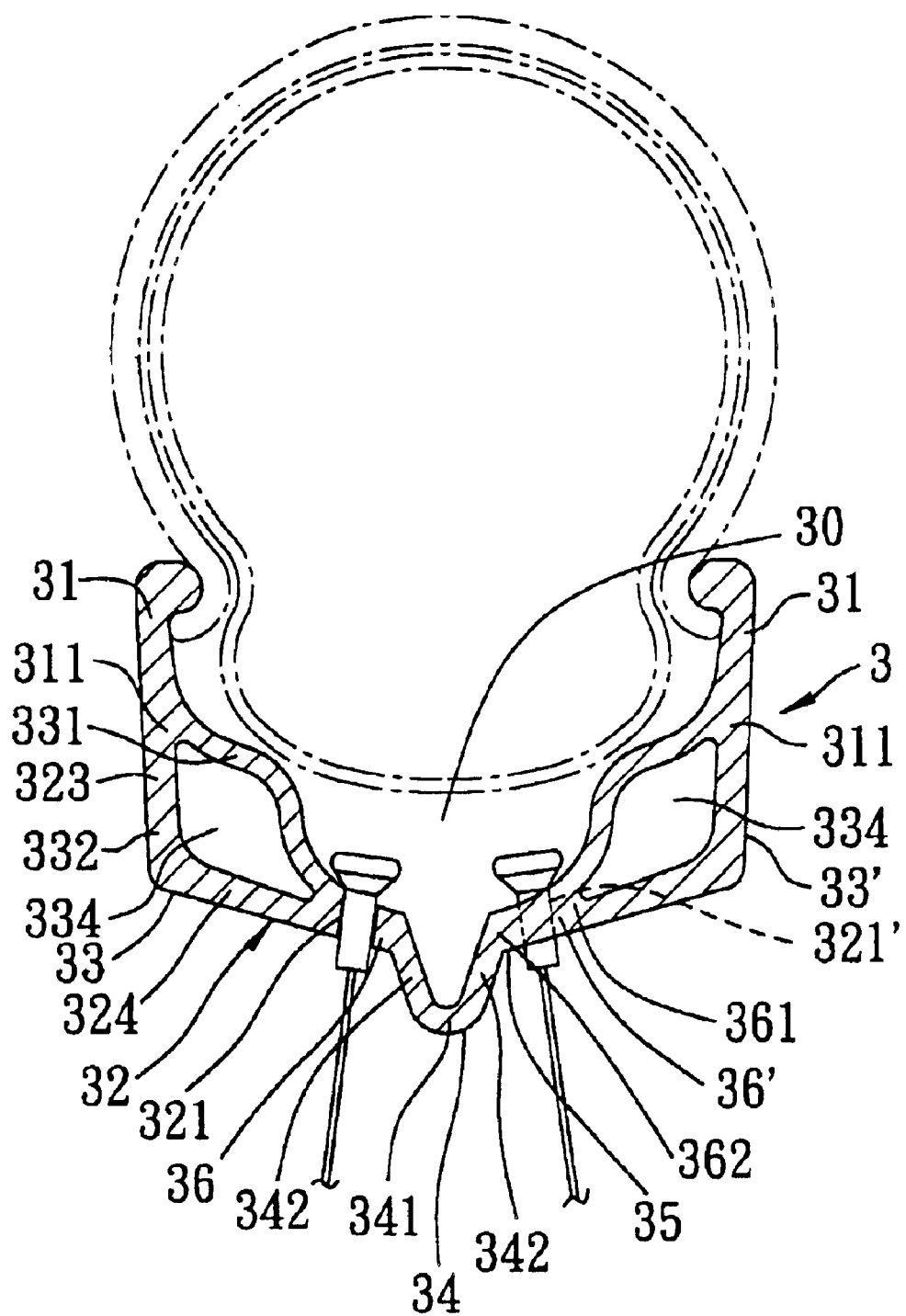
FIG. 4 is a fragmentary sectional view of a first preferred embodiment of the bicycle wheel rim according to the present invention.

Referring to FIG. 4, the first preferred embodiment of the bicycle wheel rim 3 according to the present invention is shown to include an integrally formed annular rim body which has annular left and right tire retaining walls 31 that are spaced-apart from each other, and an annular base wall 32 interconnecting the tire retaining walls 31 and cooperating with the tire retaining walls 31 to confine an annular tire retaining space 30 thereamong. Each of the tire retaining walls 31 has a radial inner edge 311 proximate to a central axis of the annular rim body. The base wall 32 extends between the radial inner edges 311, and includes left and right corner parts 33, 33' disposed adjacent and connected to the left and right tire retaining walls 311, respectively, and an intermediate part 35 extending between the corner parts 33, 33'. The intermediate part 35 has left and right wall sections 36, 36', each of which has a first terminating edge 361 disposed adjacent and connected to the respective one of the left and right corner parts 33, 33', and a second terminating edge 362 opposite to the first terminating edge 361. The intermediate part 35 further has a vaulted portion 34 interconnecting the first terminating edges 361 of the left and right wall sections 36, 36'. The vaulted portion 34 is vaulted in a radial inward direction relative to the left and right wall sections 36, 36' with respect to the central axis of the annular rim body. The vaulted portion 34 has a generally U-shaped cross-section, a tip 341 proximate to the central axis, and two inclined side walls 342 each extending between the tip 341 and the second terminating edge 362 of a respective one of the left and right wall sections 36, 36'. The intermediate part 35 of the base wall 32 is formed with a first set of spoke mounting holes 321 which are distributed along the base wall 32 in the left wall section 36, and a second set of spoke mounting holes 321' which are distributed along the base wall 32 in the right wall section 36'. The first set of spoke mounting holes 321 are staggered with respect to the second set of spoke mounting holes 321'.

Each of the corner parts 33, 33'of the base wall 32 has a hollow configuration, and includes an outer wall member 331 confronting the tire retaining space 30, an inner wall member 332 opposite to the outer wall member 331, and a cavity 334 formed between the inner and outer wall members 332, 331. The inner and outer wall members 332, 331 of each of the corner parts 33, 33' extend from the radial inner edge 311 of the respective one of the tire retaining walls 31 to the first terminating edge 361 of the corresponding one of the left and right wall sections 36, 36' of the intermediate part 35.

Preferably, the inner wall member 332 has a first section 323 connected to and flush with the tire retaining wall 31, and a second section 324 bent from the first section 323. The second section 324 is connected to and is flush with the corresponding one of the left and right wall sections 36, 36' of the intermediate part 35. Each of the left and right corner parts 36, 36' has a width measured between a respective one of the tire retaining walls 31 and the first terminating edge 361 of the corresponding one of the left and right wall sections 36, 36'. The width of each of the left and right corner parts 36, 36' is about one-third of the total width of the annular rim body measured between the left and right tire retaining walls 31.

Figure 5:
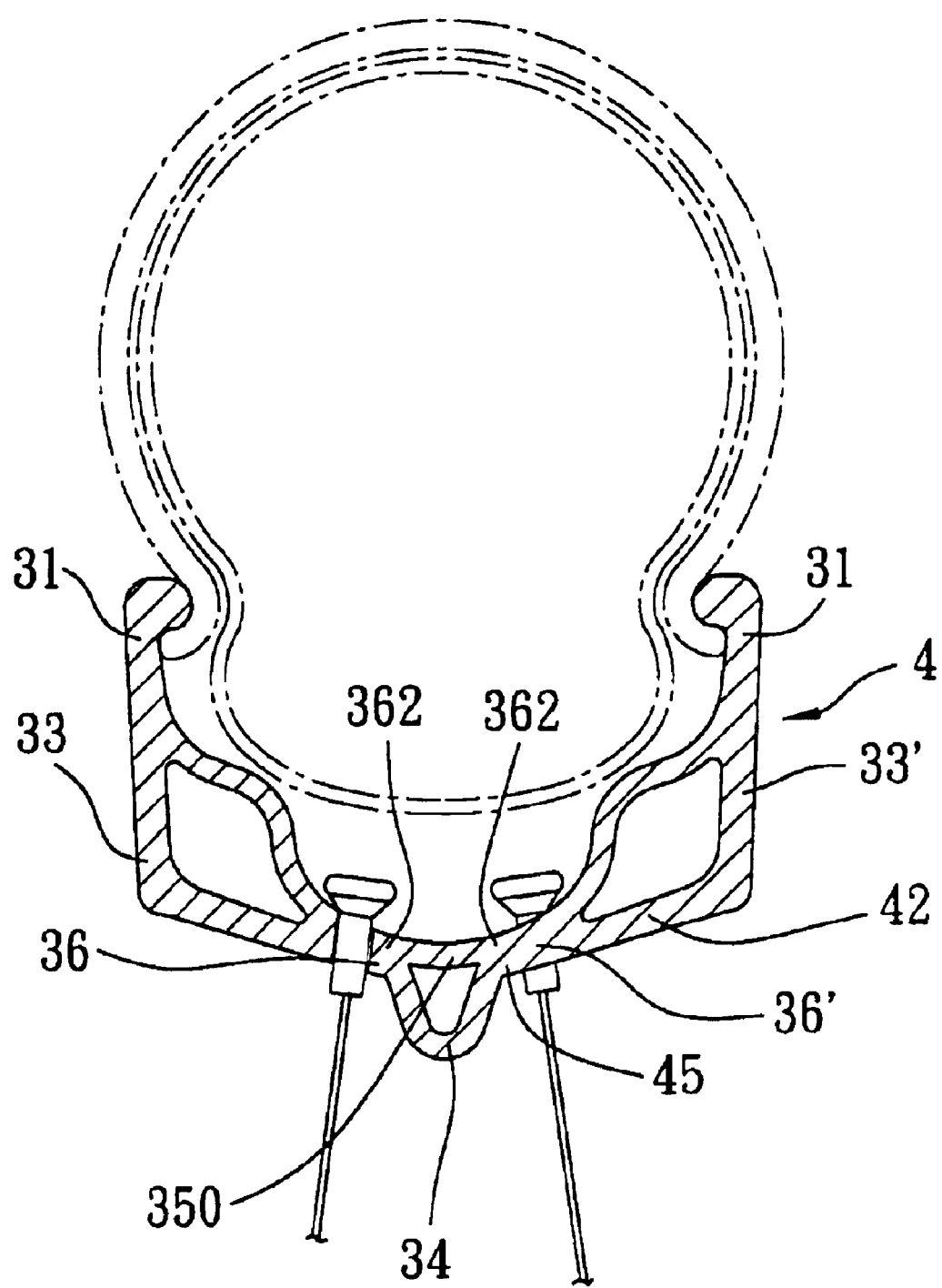
FIG. 5 is a fragmentary sectional view of a second preferred embodiment of the bicycle wheel rim according to the present invention.

Referring to FIG. 5, the second preferred embodiment of the bicycle wheel rim 4 according to the present invention is shown to have a structure similar to that of the previous embodiment, except that the intermediate part 45 of the base wall 42 further includes a bridging wall 350 extending between and interconnecting the second terminating edges 362 of the left and right wall sections 36, 36'. As shown, the bridging wall 350 is flush with the left and right wall sections 36, 36'.

Figure 6:
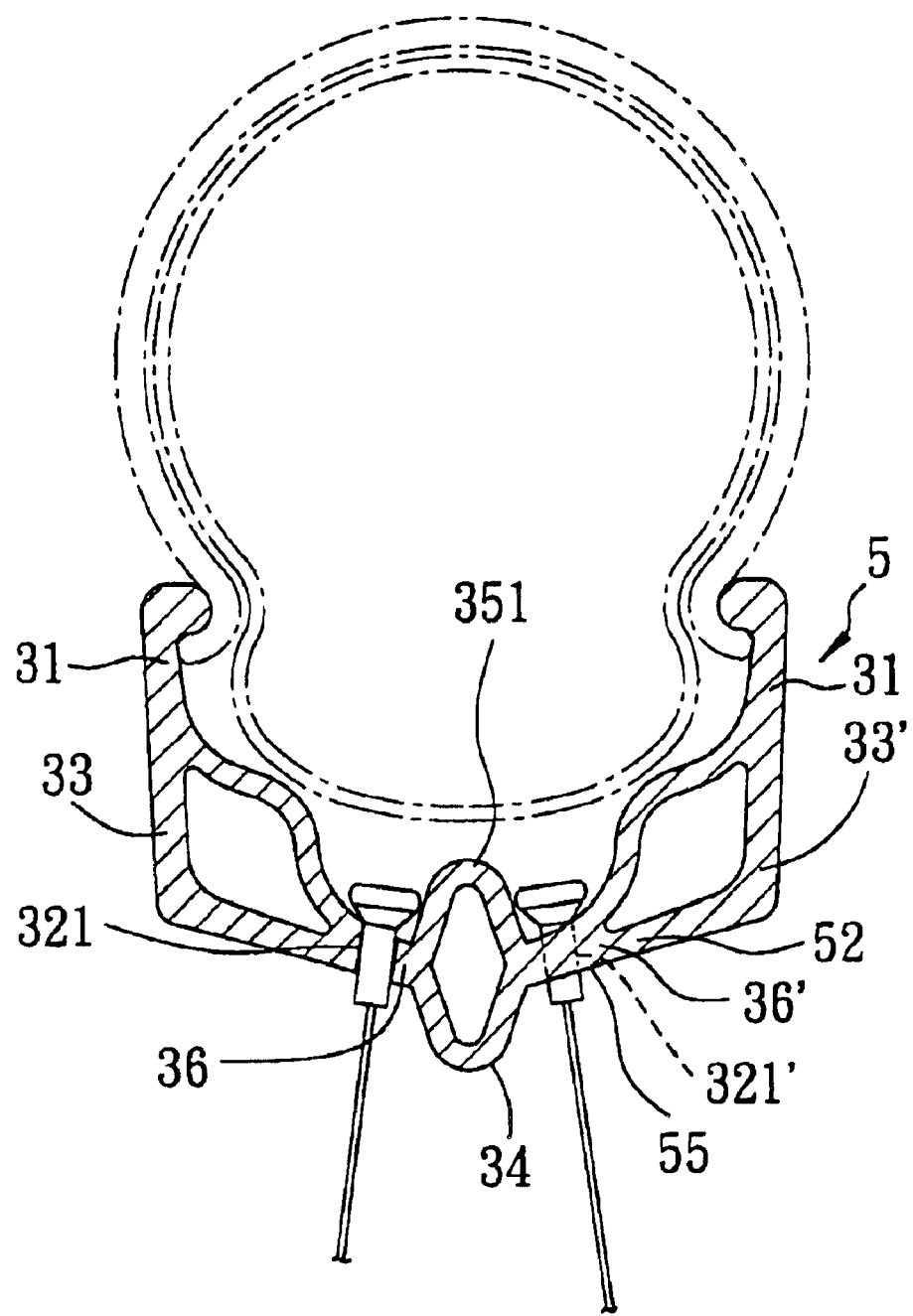
FIG. 6 is a fragmentary sectional view of a third preferred embodiment of the bicycle wheel rim according to the present invention.

Referring to FIG. 6, the third preferred embodiment of the bicycle wheel rim 5 according to the present invention is shown to have a structure similar to that of the previous embodiment shown in FIG. 5, except that the bridging wall 351 at the intermediate part 55 of the base wall 52 is vaulted in a radial outward direction with respect to the central axis of the annular rim body relative to the left and right wall sections 36, 36', and has an inverted U-shaped cross-section.

Figure 7:
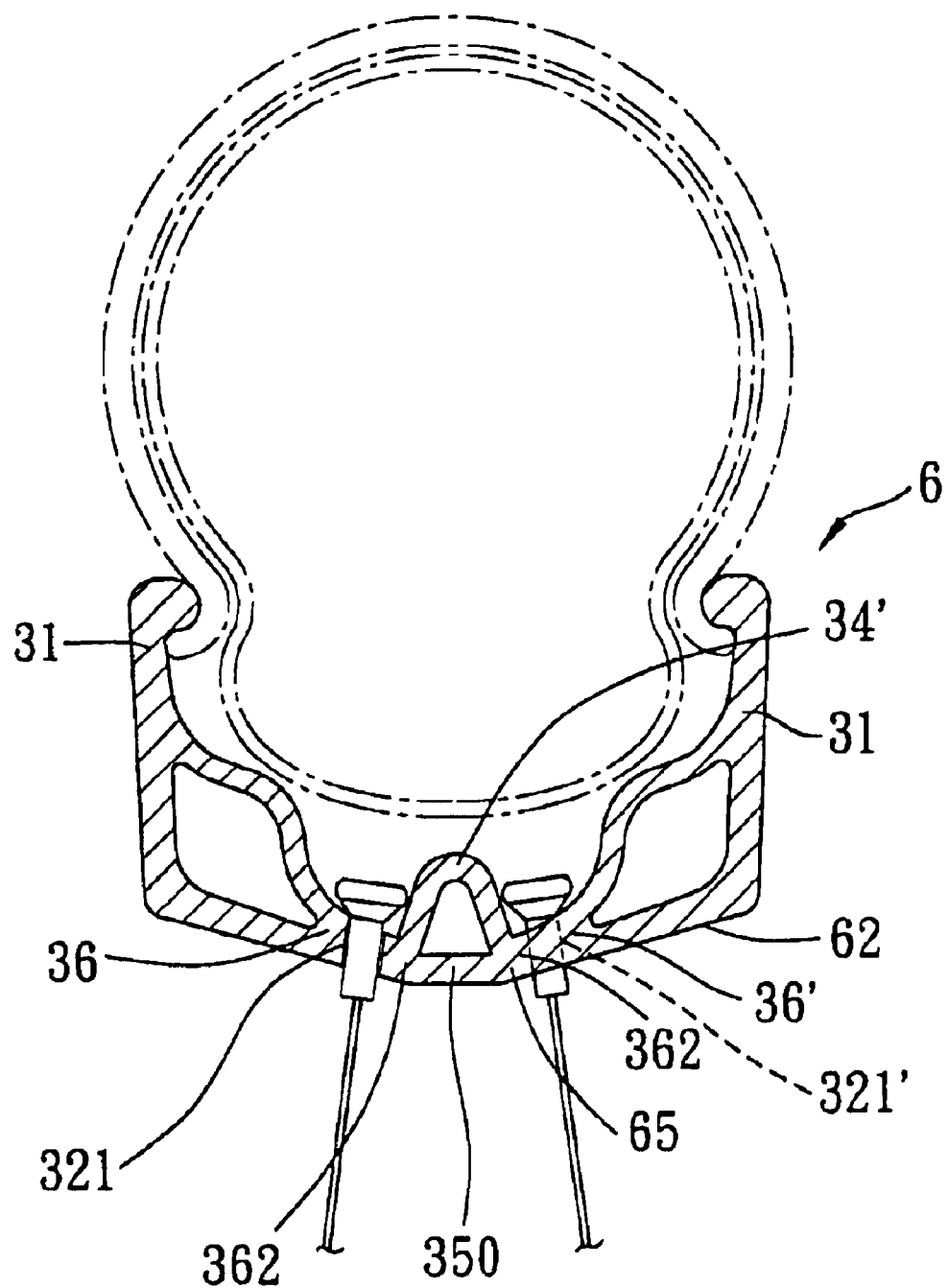
FIG. 7 is a fragmentary sectional view of a fourth preferred embodiment of the bicycle wheel rim according to the present invention.

Referring to FIG. 7, the fourth preferred embodiment of the bicycle wheel rim 6 according to the present invention is shown to have a structure similar to that of the previous embodiment shown in FIG. 5, except that the vaulted portion 34' is vaulted in a radial outward direction with respect to the central axis of the annular rim body relative to the left and right wall sections 36, 36' of the intermediate part 65 of the base wall 62.

It has thus been shown that, with the provision of the left and right corner parts 33, 33' and the intermediate part 35, 45, 55, 65, the base wall 32, 42, 52, 62 is reinforced. Moreover, the spoke mounting holes 321, 321' can be formed in the base wall 32, 42, 52, 62 through a relatively simple punching process in which only the left and right wall sections 36,36' are required to be punched.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim comprising an annular rim body with a central axis, said rim body including:

annular left and right tire retaining walls which are spaced-apart from each other, each of said tire retaining walls having a radial inner edge proximate to the central axis of said rim body; and an annular base wall interconnecting said radial inner edges of said left and right tire retaining walls and cooperating with said tire retaining walls to confine a tire retaining space therebetween, said base wall including left and right corner parts disposed adjacent and connected to said left and right tire retaining walls, respectively, and an intermediate part extending between said corner parts, said intermediate part having a vaulted portion which is vaulted in a radial inward direction with respect to the central axis, said intermediate part being formed with a first set of spoke mounting holes which are distributed along said base wall between said vaulted portion and said left corner part, and a second set of spoke mounting holes which are distributed along said base wall between said vaulted portion and said right corner part.

2. The bicycle wheel rim as claimed in claim 1, wherein said vaulted portion has a U-shaped cross-section.

3. The bicycle wheel rim as claimed in claim 1, wherein each of said left and right corner parts of said base wall is formed with a cavity.

4. The bicycle wheel rim as claimed in claim 1, wherein said intermediate part of said base wall includes a left wall section extending between said vaulted portion and said left corner part and formed with said first set of spoke mounting holes, and a right wall section extending between said vaulted portion and said right corner part and formed with said second set of spoke mounting holes, each of said left and right wall sections having a first terminating edge connected to the respective one of said left and right corner parts, and a second terminating edge opposite to said first terminating edge and connected to said vaulted portion, each of said corner parts including an outer wall member facing said tire retaining space, an inner wall member opposite to said outer wall member, and a cavity formed between said inner and outer wall members, said inner and outer wall members extending from said radial inner edge of the respective one of said tire retaining walls to said first terminating edge of the corresponding one of said left and right wall sections of said intermediate part.

5. The bicycle wheel rim as claimed in claim 1, wherein said intermediate part of said base wall includes a left wall section extending between said vaulted portion and said left corner part and formed with said first set of spoke mounting holes, and a right wall section extending between said vaulted portion and said right corner part and formed with said second set of spoke mounting holes, each of said left and right wall sections having a first terminating edge connected to the respective one of said left and right corner parts, and a second terminating edge opposite to said first terminating edge and connected to said vaulted portion, said intermediate part of said base wall further including a bridging wall which extends between and which interconnects said second terminating edges of said left and right wall sections.

6. The bicycle wheel rim as claimed in claim 5, wherein said bridging wall is flush with said left and right wall sections.

7. The bicycle wheel rim as claimed in claim 5, wherein said bridging wall is vaulted in a radial outward direction with respect to the central axis relative to said left and right wall sections.

8. A bicycle wheel rim comprising an annular rim body with a central axis, said rim body including:
   annular left and right tire retaining walls which are spaced-apart from each other, each of said tire retaining walls having a radial inner edge proximate to the central axis of said rim body; and
   an annular base wall interconnecting said radial inner edges of said tire retaining walls and cooperating with said tire retaining walls to confine a tire retaining space therebetween, said base wall including left and right corner parts disposed adjacent and connected to said left and right tire retaining walls, respectively, and an intermediate part extending between said corner parts, said intermediate part having a vaulted portion which is vaulted in a radial outward direction with respect to the central axis, a left wall section extending between said vaulted portion and said left corner part and formed with a first set of spoke mounting holes, and a right wall section extending between said vaulted portion and said right corner part and formed with a second set of spoke mounting holes, each of said left and right wall sections having a first terminating edge connected to the respective one of said left and right corner parts, and a second terminating edge opposite to said first terminating edge and connected to said vaulted portion, said intermediate part of said base wall further including a bridging wall which extends between said second terminating edges of said left and right wall sections, said bridging wall being flush with said left and right wall sections.

9. The bicycle wheel rim as claimed in claim 8, wherein said vaulted portion has an inverted U-shaped cross-section.

10. The bicycle wheel rim as claimed in claim 8, wherein each of said left and right corner parts of said base wall is formed with a cavity.

11. The bicycle wheel rim as claimed in claim 8, wherein each of said corner parts includes an outer wall member facing said tire retaining space, an inner wall member opposite to said outer wall member, and a cavity formed between said inner and outer wall members, said inner and outer wall members extending from said radial inner edge of the respective one of said tire retaining walls to said first terminating edge of the corresponding one of said left and right wall sections of said intermediate part.

* * * * *